H. T. KRAKAU.
ENGINE COUPLING.
APPLICATION FILED MAY 13, 1911. RENEWED APR. 28, 1914.
1,193,486.
Patented Aug. 1, 1916.
3 SHEETS—SHEET 1.
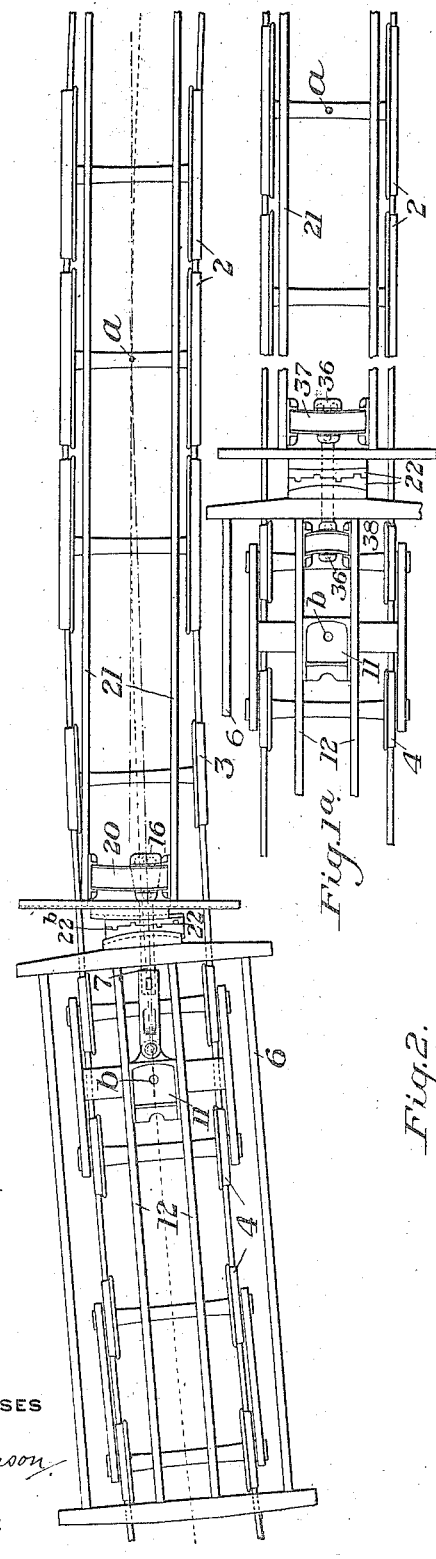
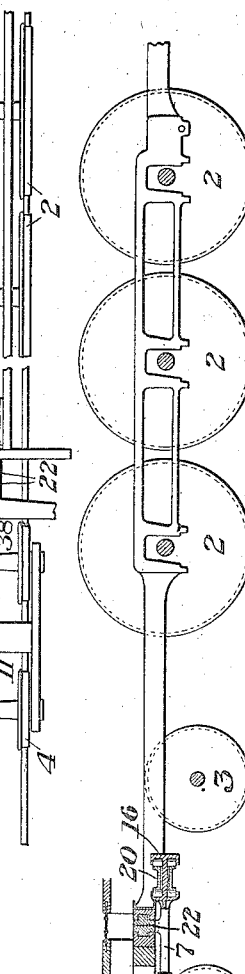
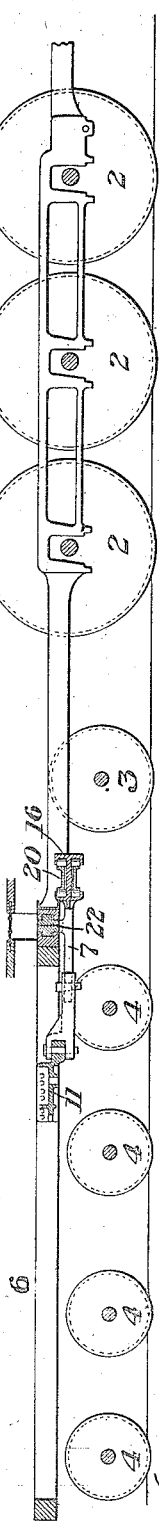
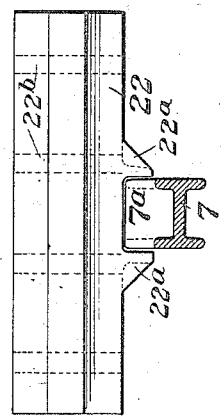
WITNESSES
R A Balderson
W Famariss
INVENTOR
H. T. Krakau
by Bakewell, Byrnes Parmelee
his Attys

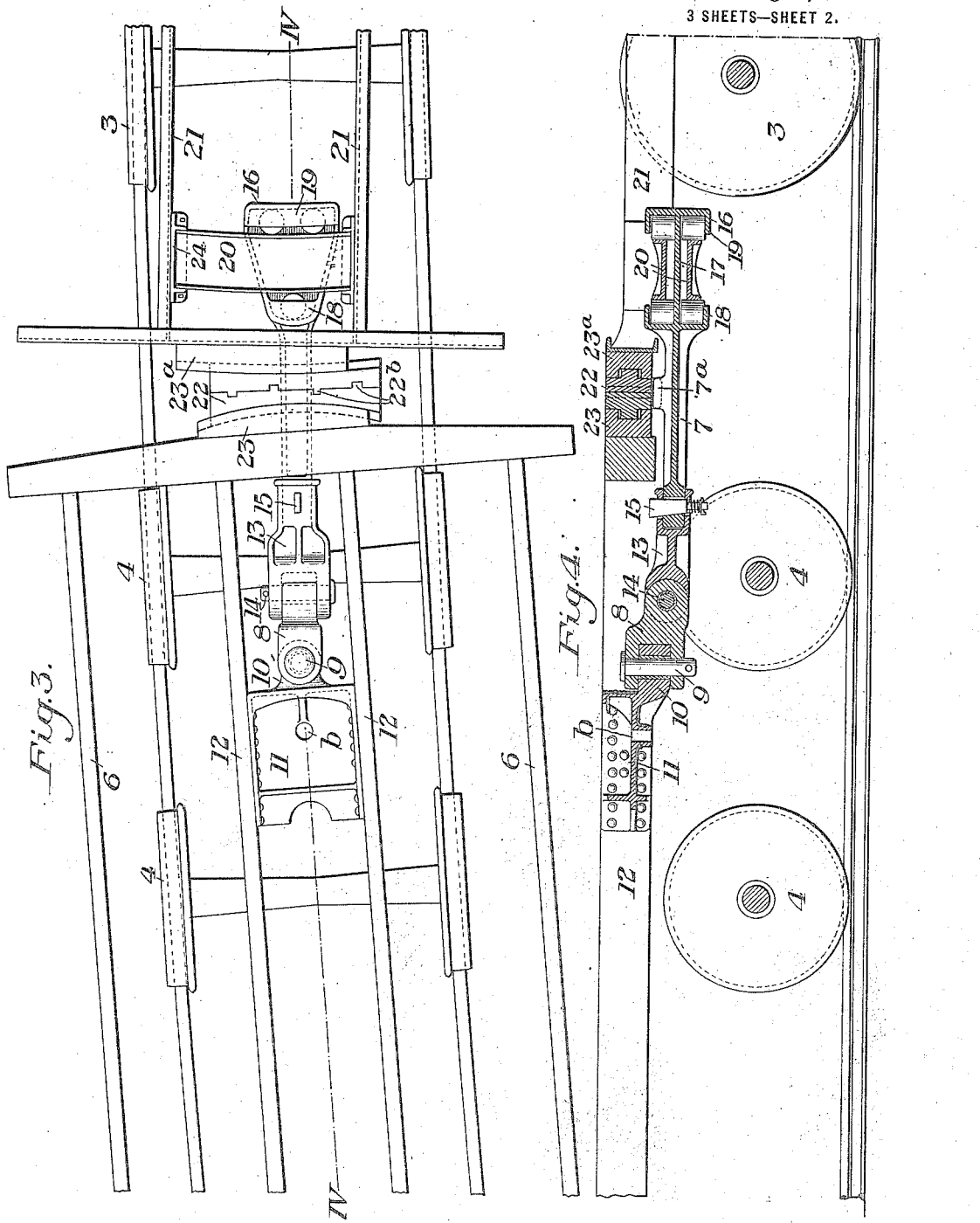

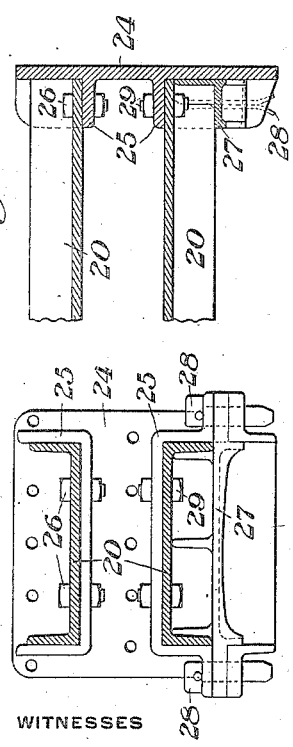
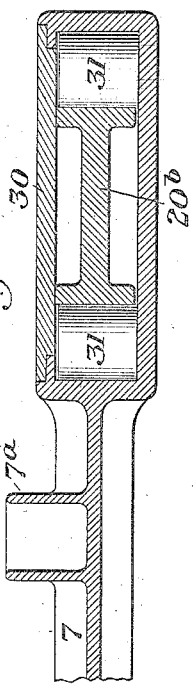
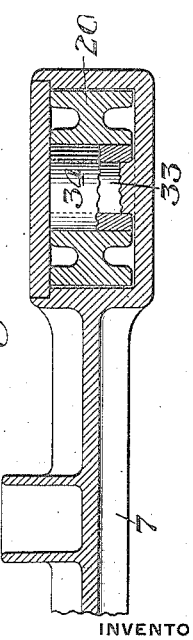
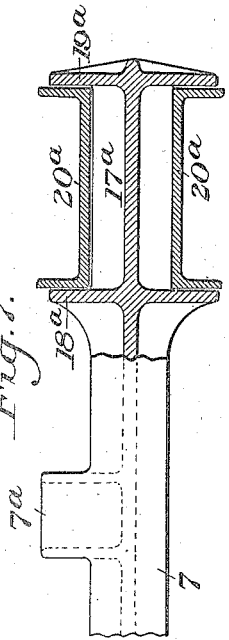
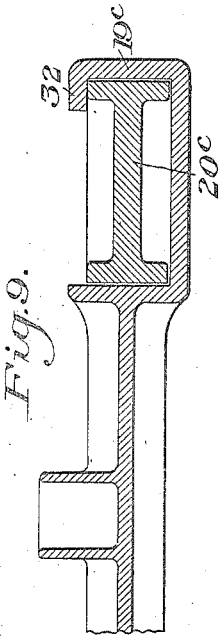
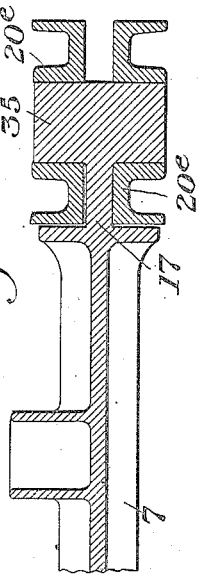

UNITED STATES PATENT OFFICE.

HARRY T. KRAKAU, OF CLEVELAND, OHIO, ASSIGNOR TO THE NATIONAL MALLEABLE CASTINGS COMPANY, OF CLEVELAND, OHIO, A CORPORATION OF OHIO.

ENGINE-COUPLING.

1,193,486.  Specification of Letters Patent.  Patented Aug. 1, 1916.

Application filed May 13, 1911, Serial No. 627,039. Renewed April 28, 1914. Serial No. 835,047.

*To all whom it may concern:*

Be it known that I, HARRY T. KRAKAU, a citizen of the United States, and a resident of Cleveland, in the county of Cuyahoga and State of Ohio, have invented a new and useful Improvement in Engine-Couplings, of which the following is a full, clear, and exact description, reference being had to the accompanying drawings, forming part of this specification, in which:

Figure 1 is a plan view showing the truck of an engine and tender provided with my improved coupling; Fig. 1ª is a plan view showing a modification; Fig. 2 is a side elevation of Fig. 1, partly in section; Fig. 2ª is a detail sectional view showing the connection between the coupling member and the buffer block; Fig. 3 is an enlarged top plan view of another modified form of the coupling; Fig. 4 is a sectional side elevation of Fig. 3; Figs. 5 and 6 are detail views of the end plates for the pulling segment; and Figs. 7, 8, 9, 10 and 11 are detail views showing different arrangements of the movable traveler and pulling segments.

My invention relates to the connection between engines and tenders, and is designed to overcome certain difficulties inherent with the present methods of connection.

The coupling now employed between engines and tenders consists of a rigid bar extending beneath the engine and tender and connected thereto by pivot pins at points relatively near the adjacent ends of both engine and tender, these ends abutting squarely against each other. The correct location of the pivotal points of the ends of this coupling bar should be the centers of motion or pivotal centers of the engine driver truck and the adjacent tender truck, respectively, but such a location is impossible, upon the engine at least, with the present construction of locomotives. The present bar connection, owing to the fact that its incorrectly located pivot points change their distance from each other when the engine and tender pass around a curve, causes great strain to be thrown upon the bar and this condition is largely aggravated by the abutting square ends of the locomotive and tender which corner upon each other in passing around curves and exert a powerful pressure to stretch the bar by still further increasing the distance between these pivoted ends. It will readily be seen that such a form of construction allows no lateral flexibility between the locomotive and tender and this lateral regidity causes grinding on the wheel flanges, wear and spreading of the rails and a tendency to force the wheels over and off the rails on curved portions of the track.

My invention is designed to overcome these difficulties not only by providing lateral flexibility between engine and tender, but by so connecting the coupling bar to both, that its points of engagement at either end never tend to increase their distance from each other. This is accomplished by allowing this bar to have substantially the same movement which it would have if pivoted at the centers of motion of the adjacent engine and tender trucks, and by so constructing the abutting ends of the engine and tender that they do not tend to corner upon each other when angling horizontally as in passing around a curve. In this way, all friction and strains with the damage and loss incident thereto are eliminated.

In the drawings (Figs. 1, 2, 3 and 4) 2 represents the driving wheels of an engine truck, shown in this instance as a six-wheel truck having its pivotal center at *a;* and 3 represents the trailer wheels of the engine; 4 represents the adjacent truck wheels of the tender truck; and 6 indicates the frame of the tender. The center of the tender truck is indicated at *b*, and on curves, the coupling should be maintained on a straight line connecting the points *a* and *b*. As this is impossible in practice, owing to the location of the fire box and other parts of the engine, which would interfere, I provide a coupling consisting of a bar 7, the rear portion 8 of which is horizontally pivoted on a vertical pin 9, on the tender frame; this pin being as near as possible to the center of motion *b* of the tender truck. As shown, the pin passes through suitable ears on the part 8 and through a lug 10 on a pivot casting 11, secured to the center sills 12 of the truck frame. The part 8 is connected to the bar 7 by an intermediate member 13, which is rigidly keyed to the bar 7 and is pivoted to the part 8 by a horizontal pin 14, thus giving a universal connection between the bar 7 and the tender frame, as shown in the preferred forms of Figs. 3 and 4, or the part 8 may be made integral with the bar 7, as shown in Figs. 1 and 2. I have shown the bar 7 as connected to the part 13 by a tapered key 15, though any suitable detachable connection may be employed.

The forward end of the bar 7 carries a traveling cage or case 16, which is preferably formed as an integral casting with the bar 7. In the form shown in Figs. 3 and 4, the traveling cage has a central horizontal web 17, with inwardly flanged heads 18 and 19, which contain antifriction rollers. These rollers bear upon the flanged front and rear faces of a two-part pulling segment 20, whose ends are secured to the members 21 of the engine frame. This pulling segment has its front and rear faces struck substantially on arcs of circles from the point $a$ as a center, and the web 17 of the traveler moves between the upper and lower halves of the segment 20.

The intermediate portion of the bar 1 is provided with upwardly projecting lips $7^a$ which engage downward projections $22^a$ on a movable buffer block 22, having concave front and rear faces. The concavity of these faces fits the convex faces of buffers 23 and $23^a$, secured to the end framing of the tender and engine, respectively, the arc of part 23 being struck from the center of the pin 9 and the arc of the buffer $23^a$ being struck from the point $a$ as a center. The buffer block 22 is suitably engaged with the buffers 23 and $23^a$ in any desirable way. In the form shown, this is accomplished by recessing the upper and lower portions of the buffer block, causing its thicker central portion to engage recesses in the faces of buffers 23 and $23^a$.

I preferably divide the buffer 22 vertically and longitudinally into two sections, having a suitable interlocking engagement with each other, as by means of the interfitting lugs and recesses $22^b$, to hold the sections rigid with respect to lateral movement, but permitting relative vertical movement, such as may occur when the locomotive and tender are passing over irregularities in the track.

In the operation of the system, as the engine and tender move around a curve, the bar 7 will swing on the pin 9, its traveling head moving along the pulling segment on the engine. In this manner, the coupling bar will maintain itself substantially in the straight line between the points $a$ and $b$, and thus prevent the excessive strain, friction and binding incident to the present engine couplings. In other words, the coupling will maintain itself in the line of pull between the trucks, which is impossible with the present engine couplings.

The provision of the curved buffing blocks 22, 23 and $23^a$ prevents any cornering action of the abutting tender and engine frames when passing around curves. This cornering action exerts a powerful leverage, tending to rupture the coupling bar; and the bar 7, in its lateral movements, by reason of its engagement with the buffer 22, will always guide said buffer into its proper position between the curved buffers on the engine and tender.

It will be apparent that my invention provides a coupling between the engine and tender, such that the points of engagement of the ends of the coupling member with the engine and tender are always the same distance apart.

In Figs. 5 and 6, I show the details of the connection of the segment 20. In these figures, 24 is one of the end plates secured to the sill member 21, this casting having integral flanges 25, to fit the flanged ends of the two segments. The upper segment is dropped into place in the flanges of these end plates and is secured by bolts 26, while the lower segment is pushed up underneath into the lower pocket, and a liner 27 is then slid into place beneath it and is secured by cotter bolts 28. The lower segment is secured to the lower flange by the bolts 29.

In Fig. 7, I show a form of traveler head similar to that shown in Figs. 3 and 4, except that the heads $18^a$ and $19^a$ are not flanged, and the roller bearings are done away with.

In Fig. 8, the segment $20^b$ is of single form, the traveling cage taking the form of a box with a removable top portion 30, secured thereto, rollers 31 being interposed between the front and rear faces of the segment and the front and rear faces of the box.

In Fig. 9, the segment is a single bar $20^c$, while the traveling cage partially encircles it, the one head $19^c$ lipping over the top of the segment, as shown at 32.

In Fig. 10, the cage takes the form of a box surrounding the segment $20^d$, the box having a central upwardly projecting stem 33, carrying a bushing or roller 34, moving within a curved central slot.

In Fig. 11, the segment $20^e$ is in two parts, and the web $17^a$ of the traveling cage has a head 35 traveling within curved slots in the segment irons.

In Fig. $1^a$, I have shown a modification in which both ends of the coupling bar are provided with travelers 36, engaging pulling segments 37 and 38, secured respectively to the engine and tender frames. The arcs of curvature of the segment 38 are struck from the truck center $b$ as a center. In this construction, the coupling bar moves radially about both centers $a$ and $b$ in substantially the same manner as in the constructions before described.

While the center at $a$ is not a pivotal connection between the engine frame and the truck, as is the point $b$ on the tender, it is nevertheless the pivotal center of the truck, being the point which is always maintained over the center of the track. In engines of the articulated type, this point $a$ will be the pivotal center of the drivers forming the rear truck.

The advantages of my invention will be obvious to those skilled in the art, since the excessive strain and wear and the extra power incident thereto are practically eliminated, and the danger of derailment on account of the lateral strains on the frames and wheels is practically done away with. The pull is always substantially on a line between the truck centers on curves as well as on straight portions of the track and excessive strain and wear thus avoided.

Many different forms of connections between the coupling bar and the segment may be employed, the universal coupling connection for the bar may or may not be used, and many other changes may be made without departing from my invention.

I claim:—

1. In an engine coupling, a coupling member engaging the tender, and its other end having connection with the engine frame at a point to the rear of the center of its driving wheel truck, said member being movable radially about said center.

2. In an engine coupling, a coupling member engaging the tender and having its other end provided with a movable engagement with the engine frame at a point at the rear of the pivotal center of the driving wheel truck, the line of movement of said connection being substantially equidistant from said center at all points.

3. In an engine coupling, a bar pivoted to the tender truck and having its end portion engaging with and moving along a pulling segment on the engine.

4. In an engine coupling, an engine and tender having coöperating buffers with convex faces, and a buffer block concaved on opposite faces to engage the convexed faces of both buffers, the convex faces of the buffers being substantially on arcs struck respectively from the center of the engine truck and a point adjacent to the center of the tender truck, and a bar with its rear end pivoted adjacent to the center of the tender truck and having its other end engaged with and moved on a pulling segment on the engine, said bar also having an intermediate engagement with the buffer block.

5. In an engine coupling, a coupling bar pivoted adjacent to the center of the tender truck and having its front end engaged with and traveling over a pulling segment on the engine, said segment having its arc of curvature struck from the pivotal center of the driving wheel truck of the engine.

6. In an engine coupling, an engine and tender having coöperating buffers with convex faces, and a concaved face buffer block engaged with said faces and connected with a pivotal coupling bar, said block being formed in sections capable of relative vertical movements, but rigid with respect to lateral movements.

7. A buffer block for couplers, having double concaved transverse faces and divided vertically into two sections capable of relative vertical movements.

8. In a draft gear for railway vehicles, the combination with a chafing plate adapted to be attached to each of the adjacent ends of two vehicles, and having a convex surface, of a chafing block formed in separate parts interposed between said chafing plates, and having concave surfaces, said parts having the capacity of relative vertical movement, and means for preventing relative transverse movement between said parts.

9. In a draft gear for railway vehicles, the combination with a chafing plate adapted to be attached to each of the adjacent ends of two vehicles, and having a convex surface, of a chafing block having double concave faces coöperating with the convex surfaces of the two adjacent chafing plates, said block being formed in separate parts having the capacity of a relative vertical movement.

10. In a draft gear for railway vehicles, the combination with a chafing plate adapted to be attached to each of the adjacent ends of two vehicles, and having a convex surface, of a chafing block having double concave faces coöperating with the convex surfaces of the two adjacent chafing plates, said block being formed in separate parts having the capacity of a relative vertical movement, and means attaching said parts to the respective chafing plates.

11. In a draft gear for railway vehicles, the combination with a chafing plate adapted to be attached to each of the adjacent ends of two vehicles, and having a convex surface, of a chafing block having double concave faces coöperating with the convex surfaces of the two adjacent chafing plates, said block being formed in separate parts having the capacity of a relative vertical movement, and projecting flanges on one of said parts for preventing a transverse movement of one part relative to the other.

12. In an engine coupling, a coupling member pivotally engaging the tender at one end and its other end being secured to the engine frame and being movable radially about the center of motion of its driving wheel truck.

In testimony whereof, I have hereunto set my hand.

HARRY T. KRAKAU.

Witnesses:
CHESTER K. BROOKS,
GERALD C. DIXON.